Nov. 25, 1952    M. L. SWEENEY, JR    2,619,108
DUAL VALVE FOR CONTROLLING LIQUID LEVEL
Filed Feb. 15, 1950

INVENTOR.
MORGAN L. SWEENEY, JR.
BY John N. Wolfram
Agent

Patented Nov. 25, 1952

2,619,108

UNITED STATES PATENT OFFICE 2,619,108

DUAL VALVE FOR CONTROLLING LIQUID LEVEL

Morgan L. Sweeney, Jr., Los Angeles, Calif., assignor to The Parker Appliance Company, Cleveland, Ohio, a corporation of Ohio Application February 15, 1950, Serial No. 144,249

15 Claims. (Cl. 137—400)

This invention relates to valves for controlling the level to which a tank may be filled with a liquid and which operates to automatically shut off when the liquid in the tank reaches a predetermined level. The valve is adapted to be attached to a tank and has means for connecting to a supply line for filling the tank. The incoming liquid passes through the valve and when the tank has been filled to a predetermined level the valve automatically shuts off to prevent further liquid from entering the tank.

The invention seeks to provide a control valve of this type in which two valve units are combined within one housing and serially control the flow of liquid from the supply nozzle to the interior of the tank and in which each of the units is responsive to a separate float operated pilot valve for independently shutting off the flow of liquid into the tank, thus providing a safety feature in that either of the units will independently cut off the flow if the other should fail to operate.

Liquid level control valves are particularly used in connection with the filling of fuel tanks in aircraft. Single unit control valves will operate to shut off the incoming fuel but if for any reason the valve should fail to operate the incoming fuel will not be shut off and if not otherwise shut off before the tank is completely full it may overflow and cause a serious fire hazard or it may burst the tank.

It is an object of the present invention to provide a valve for controlling the level to which a tank may be filled in which two main valves operated by fluid pressure and controlled by separate float operated pilot valves serially control the flow of incoming fluid and are operable independently of each other for cutting off the flow when the fluid in the tank has reached a predetermined level.

It is another object to provide a liquid level control valve of the type described in which two fluid pressure operated main valves serially control the flow of liquid into a tank and in which the main valves are mounted in axial alignment within a common valve housing.

Another object is to provide a valve of the type described in which the housing containing the valves is formed in several sections to facilitate assembly and maintenance of the valves in service.

It is another object to provide a liquid level control valve having two fluid pressure operated main valves mounted in a common housing and serially in control of a single flow passage through the housing and in which the main valves are guided by a common central bolt.

It is another object to provide a valve of the type described in which the housing is formed in a plurality of sections and which sections are secured together by a single bolt passing through the central portion of the sections.

Another object is to provide a device for controlling the level to which a tank may be filled with a liquid comprising a pair of diaphragm type fluid pressure operated main valves within a common housing and in which the housing is made in several sections which are so formed that the outer margin of each diaphragm will be clamped between adjacent housing sections when the sections are secured together.

It is another object to provide a valve for controlling the level to which a tank may be filled in which two fluid pressure operated main valves for controlling the flow of fluid are mounted in a common sectional housing and in which a single bolt serves both for securing the housing sections together and for guiding the valves to and from their seats.

It is another object of the invention to provide a flow control device for use in a tank filling system in which the device has a passage therethrough and having a pair of fluid pressure operated main valves serially in control of the flow of fluid through the passage and in which means is provided for connecting a separate pilot valve to each of said fluid pressure valves for opening and closing of the latter.

Other objects and advantages will be apparent from a detailed description and from the drawings in which.

Figure 2:
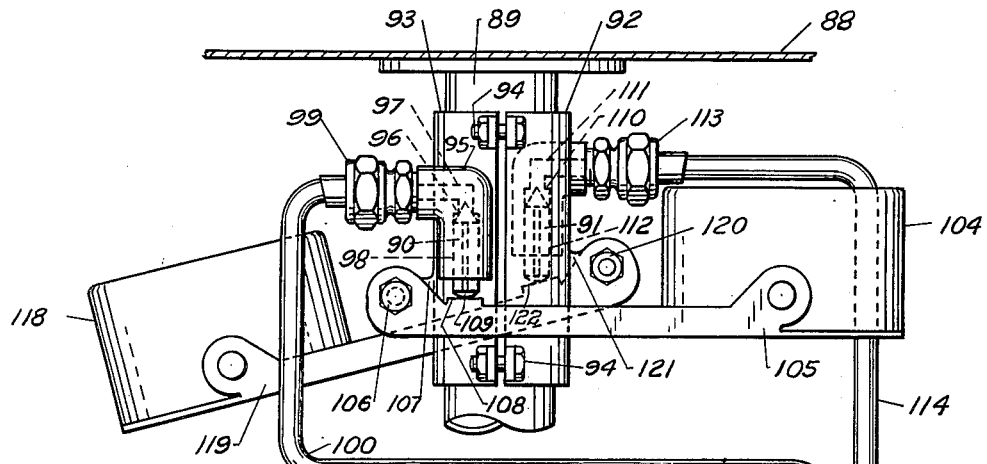
Fig. 2 is a side view of a unit comprising a pair of float operated pilot valves responsive to a predetermined level of liquid within the tank for controlling the fluid pressure operated main valves of Fig. 1.
Figure 1:
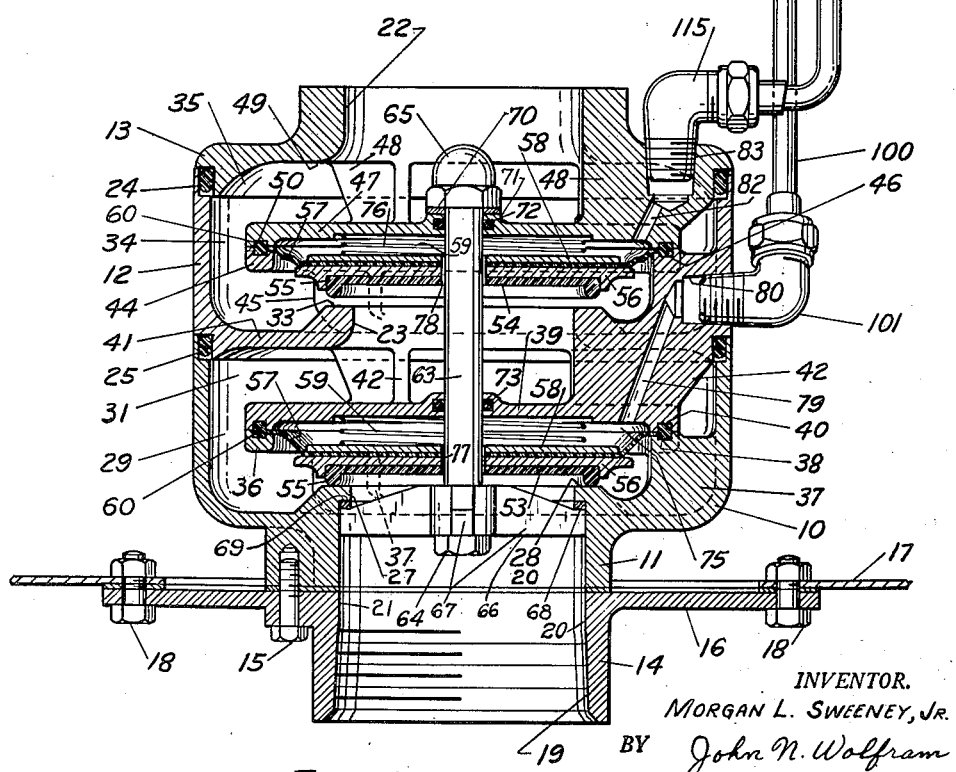
Fig. 1 is a longitudinal section through the housing containing the fluid pressure operated main valves for controlling the flow of fluid into the tank.

The invention comprises a main valve unit or device 10 having an inlet housing section 11, an intermediate housing section 12, and an outlet housing section 13. The inlet section 11 is attached to a suitable tank inlet fitting 14 by means of bolts 15. The tank inlet fitting has a flange 16 for attachment to the bottom wall 17 of a tank by means of bolts 18, and also has any suitable means such as the thread 19 to which a supply nozzle or conduit, not shown, may be attached.

The inlet section 11 of the main valve housing has an inlet port 20 in alignment with a bore 21 in the inlet fitting 14, and the outlet section 13 has an outlet port 22 open to the interior of the tank. The intermediate housing section 12 is mounted between the inlet and outlet sections and has a central port 23 between the inlet and outlet ports 20 and 22. The intermediate section is sealed at its connection with the inlet and outlet housing sections by suitable packings 24 and 25.

The inlet port 20 has a reduced portion 27 which is surrounded by a valve seat 28 which leads to a passageway 29. The intermediate housing section 12 has a passageway 31 open to the passageway 29 and leading to the central port 23 surrounded by a second valve seat 33 which in turn leads to a passageway 34. The outlet section 13 has a passageway 35 communicating with the passageway 34 and leading to the outlet port 22.

Integral with the inlet section is an annular ring 36 supported by spaced ribs 37 and having an annular groove 38. The intermediate housing section 12 has a solid transverse wall portion 39 extending across the central portion thereof and having an annular groove 40 at its outer margin opposite the annular groove 38.

The solid wall portion 39 is attached to another transverse wall portion 41 by means of ribs 42 and spaced therefrom so as to form the passage 31. The central part of the wall 41 has the port 23 formed therein. On the opposite side of the wall 41 there is another annular ring 44 integral with the intermediate housing section 12 and supported in spaced relation from the wall 41 by ribs 45. This ring has an annular groove 46.

The outlet section 13 has another transverse solid wall 47 supported by ribs 48 in spaced relation with the end wall 49 of the outlet section and having a groove 50 at its outer margin and opposite the groove 46.

Mounted within the housing are a pair of fluid pressure operated main valves generally designated as 53 and 54. Each main valve comprises a rubber-like sealing disc 55 bonded to a backing plate 56, a diaphragm 57, and a washer 58.

Springs 59 bear against the washers 58 to seal the inner margins of the diaphragms against the backing plates 56 and also serve to normally bias the valves 53 and 54 toward their respective seats 28 and 33. The outer margins of the diaphragms are enlarged so as to form beads 60 which are adapted to be received within the grooves 38—40 and 46—50 and sealingly clamped therein.

Passing through the central part of the transverse walls 39 and 47 and the valves 53 and 54 is a bolt 63 having a head 64. Adjacent the head 64 is a spider-like member 66 having radially extending arms 67 whose outer ends are adapted to bear against a thrust washer 68 which in turn bears against a shoulder 69 formed between the inlet bore 20 and its reduced portion 27. The nut 65 bears against a thrust washer 70 which in turn bears against a raised portion 71 of the solid wall 47. This bolt serves to hold the housing sections together and clamps the diaphragm beads 60 in their respective grooves between the sections. Packings 72 and 73 prevent leakage of fluid through the wall portions 39 and 47 past the bolt 63.

The main valve 53 forms with the solid wall 39 a pressure chamber 75 and the main valve 54 forms with the wall 47 a second pressure chamber 76. Each of the valves 53 and 54 has a central bore therethrough which is a loose fit about the bolt 63 so as to form restricted annular passages 77 and 78 leading from the under or inlet side of the main valves to the pressure chambers 75 and 76 respectively. A bleed passage 79 leads from the pressure chamber 75 through one of the ribs 42, the wall 41, and one of the ribs 45 and is open to the exterior of the intermediate housing section 12 by means of a threaded port 80. The pressure chamber 76 has a bleed port 82 leading therefrom through the wall 47 and one of the ribs 48 and communicating with the exterior of the outlet section 13 by means of a threaded port 83.

Mounted at the upper part 88 of the tank and supported by a suitable column or bracket 89 is a unit comprising a pair of float operated pilot valves generally designated as 90 and 91. The housing for these valves is in the nature of two sleeve sections 92 and 93 adapted to be clamped in position on the supporting member 89 by means of bolts 94. The sleeve section 93 has an integral valve housing 95 formed thereon which has a valve seat 96 therein between an inlet passage 97 and a valve chamber 98, the latter being at its lower end open to the interior of the tank. A suitable coupling 99 connects a conduit 100 to the housing 95 in communication with the inlet passage 97. The opposite end of the conduit 100 is attached to the threaded port 80 of the main valve housing in communication with the bleed port 79 by means of a coupling 101.

A float 104 is attached to one end of an arm 105 and the other end of the arm is pivotally mounted on a pin 106 supported by a lug 107 projecting from the sleeve section 93. Intermediate its ends the arm 105 has a raised portion 108 engageable with a valve plunger 109 mounted within the valve bore 98. The valve plunger 109 is non-circular throughout its length so as to permit the passage of fluid through the valve bore 98 when the valve plunger is not seated against the seat 96.

The valve 91 housed in the sleeve section 92 is similar to the valve 90. It is adapted to engage a valve seat 110 formed between an inlet passage 111 and a cylindrical valve chamber 112 also open at its lower end to the interior of the tank. The inlet passage 111 is connected by means of a coupling 113, conduit 114, and another coupling 115 to the port 83 of the main valve unit 10 in communication with the bleed passage 82. A float 118 is attached to an arm 119 which in turn is pivotally mounted on a pin 120 supported by the lug 121 on the sleeve section 92. The arm 119 likewise has a raised portion 122 engageable with the lower end of the valve 91.

As illustrated in Fig. 2, the float 104 is in its uppermost position and has moved the valve 90 into closed position. The float 118 is illustrated in its lowermost position in which the arm 119 has permitted the valve 91 to move downward by gravity to an unseated position.

Also as shown in Fig. 2, the general mounting position of the valve 91 and its associated float 118 is somewhat higher than the general mounting position of the valve 90 and its associated float 104. This is a preferred way of mounting the float operated pilot valve units so that one of the floats, in this case float 104, will be responsive to a slightly lower liquid level for closing its associated pilot valve than will the other float. The closing of the valve 90 will in turn cause the closing of the fluid pressure operated main valve 53. If either of the valves 90 or 53 should fail to operate properly, fluid will continue to enter the tank and the level will be raised to a point where the float 118 will be moved upward to close the pilot valve 91, which in turn will cause the closing of the fluid pressure operated main valve 54.

Although in some instances it may be preferred to utilize the differential mounting positions for the pilot operated valves as described above, it is not necessary for the independent and serial control of the passage through the main valve unit by the two fluid pressure operated valves and the pilot valves may be mounted at the same level if desired.

In operation the control valve 10 containing the main valve units 53 and 54 is preferably installed within a tank adjacent the tank bottom. However, it may be installed at any part of the tank, including the top or sides. The unit containing the pilot valves 90 and 91 is installed adjacent the top of the tank. The main valves 53 and 54 are normally in the closed position against the seats 28 and 33 due to the action of the springs 59. If the liquid in the tank is at a level less than a predetermined level, both of the floats 104 and 118 will be in their lowermost positions with the respective float arms 105 and 119 tilted downwardly, corresponding with the position shown in Fig. 2 for the float arm 119. In this position both pilot valves 90 and 91 will be open due to gravity.

When it is desired to fill the tank a supply nozzle, not shown, is attached to the tank inlet fitting 14 by means of the thread 19. Pressure of the incoming fluid in the inlet port 20 opens the main valve 53 against the action of the spring 59. The fluid then passes by the seat 28 into the passages 29 and 31 to the port 23. The pressure of the fluid in port 23 then opens the main valve 54 against the action of its spring 59 and passes by the valve seat 33 into the passages 34 and 35 and then through the outlet port 22 into the tank.

In the meantime incoming fluid below the main valve 53 also passes through the restricted clearance 77 into the pressure chamber 75. From there it passes through the bleed port 79 through the conduit 100 to the pilot valve 90. Since at this time the float 118 is in the downward position and the pilot valve 90 is open, the bleed fluid will pass freely through the pilot valve 90 to the interior of the tank. All of the passages through which the bleed fluid passes from the pressure chamber 75 through the conduit 100 and the pilot valve 90 to the interior of the tank are larger than the restricted opening 77 so that fluid may bleed away from the pressure chamber 75 faster than it can enter therein. Consequently the fluid cannot build up any appreciable pressure within the chamber 75 while the pilot valve 90 is open and the main valve 53 will remain open due to the pressure of the fluid coming in through the inlet port 20.

A portion of the incoming fluid passing through the port 23 makes its way into the pressure chamber 76 of the main valve 54 through the restricted passage 78 and passes therefrom through the bleed passage 82, conduit 114 and pilot valve 91 to the interior of the tank. Similarly the passage 78 is smaller than the bleed passages leading from the chamber 76 so that no appreciable fluid pressure can be built up within the chamber 76 while the pilot valve 91 is open.

When the incoming fluid has filled the tank to a predetermined level the float 104 will rise to shut off the pilot valve 90 as shown in Fig. 2. This cuts off the bleed line from pressure chamber 75 and allows the fluid entering the chamber through the restricted passage 77 to build up on the upper side of the main valve 53. When this pressure has built up to a point where it substantially balances the pressure of the incoming fluid on the underside of the valve 53, the latter will be moved to its closed position by the spring 59. As soon as the valve is seated, the area on the under side of the valve which is exposed to the pressure of the fluid within the inlet port 20 becomes that area bounded by the sealing contact of the disc 55 against the seat 28 minus the area of the hole in the center of the valve through which the bolt 63 passes. The area on the upper side of the valve against which fluid within the chamber 75 acts to urge the valve to closed position is somewhat greater than the area of the backing plate 56 minus the area of the hole through the valve. Thus there is a greater area exposed to the pressure of the fluid within the chamber 75 than is exposed to the pressure of the fluid within the port 20 and there will be an effective area acted upon by the fluid within the chamber 75 for keeping the valve tightly closed.

In the event valve 53 is not caused to close off for any reason whatsoever, the raising of the liquid level within the tank to a point slightly higher than the level effective to operate pilot valve 90 will cause float 118 to be raised so as to shut off pilot valve 91. Shutting off of this pilot valve will cause pressure to build up in chamber 76 and result in the closing of the main valve 54 in a manner similar to that already described in connection with the main valve 53.

When main valve 53 has closed off the flow of incoming fluid, flow of fluid will also cease through the port 23 and there will no longer be pressure on the underside of the main valve 54 tending to keep it open. This valve will then close under the action of its spring 59.

When the floats 104 and 118 and their respective pilot valves 90 and 91 are positioned to respond to the same predetermined level, the pilot valves will close simultaneously, or nearly so, and thus likewise cause the two main valves 53 and 54 to close at substantially the same time.

It will be apparent from the foregoing description and the drawings that each of the main valves 53 and 54 are controlled by separate pilot valves and are operable entirely independent of each other. They are serially in control of the fluid passage through the housing and the one provides a safeguard for shutting off the fluid entering the tank in the event that the other fails to operate.

The housing for the main valves is formed in three sections to facilitate assembly of the parts and also to permit ready servicing of the valve after a period of use. The bolt 63 serves to hold the three housing sections together and also to guide the main valves 53 and 54 in their movement to and from their respective seats.

From the foregoing it will be seen that a compact, easily assembled, and simple structure has been provided. Although but one form of the invention has been shown and described, it is obvious that many minor changes may be made without departing from the scope of the following claims.

I claim:

1. A fluid flow control device comprising a casing having a passage therethrough, a pair of axially aligned valve seats surrounding the passage at spaced points within the casing, a fluid pressure operated valve associated with each of said valve seats for controlling the flow of fluid through said passage, a pressure chamber associated with each of said valves, a bypass duct leading from each of said pressure chambers, each of said bypass ducts being adapted to be opened or closed to control discharge of fluid from said pressure chambers, and additional ducts for conducting fluid from said passage to said pressure chambers for closing said fluid pressure valves when said bypass ducts are closed.

2. A fluid flow control device comprising a casing having axially aligned inlet and outlet ports, a passage leading from the inlet port to the outlet port, a pair of spaced axially aligned fluid pressure operated valves serially controlling the flow of fluid through said passage from the inlet port to the outlet port, a pressure chamber asociated with each of said valves, a bypass duct leading from each of said pressure chambers, each of said bypass ducts being adapted to be opened or closed to control discharge of fluid from said pressure chambers, additional ducts for conducting fluid from said passage to said pressure chambers for closing said fluid pressure valves when said bypass ducts are closed.

3. In a liquid level control valve, a casing having axially aligned inlet, outlet, and intermediate sections and a continuous passage through said sections, valve seats in the inlet and intermediate sections surrounding said passage at spaced points, a fluid pressure operated valve associated with each seat for controlling the passage of fluid therethrough, means including separate float operated pilot valves for controlling the fluid pressure valves.

4. A liquid level control valve comprising a casing having inlet and outlet sections and a passage therethrough, a pair of axially aligned seats surrounding said passage at spaced points, a fluid pressure operated valve associated with each of said seats for controlling the passage of fluid therethrough, means including separate float operated pilot valves for controlling the fluid pressure operated valves, said fluid pressure valves each including a diaphragm, and means intermediate said inlet and outlet sections for clamping one of said diaphragms to the inlet section and the other of said diaphragms to the outlet section.

5. In a liquid level control valve, a casing having axially aligned inlet, outlet, and intermediate sections and a continuous passage through said sections, valve seats in the inlet and intermediate sections surrounding said passage at spaced points, a fluid pressure operated valve associated with each seat for controlling the passage of fluid therethrough, means including separate float operated pilot valves for controlling the fluid pressure valves, said fluid pressure valves each including a diaphragm, the outer margin of one of said diaphragms being clamped between the inlet and intermediate sections and the outer margin of the other of said diaphragms being clamped between the intermediate and outlet sections.

6. A liquid level control valve comprising a casing having inlet and outlet sections and a passage therethrough, a pair of axially aligned seats surrounding said passage at spaced points, a fluid pressure operated valve associated with each of said seats for controlling the passage of fluid therethrough, means including separate float operated pilot valves for controlling the fluid pressure operated valves, said fluid pressure valves each including a diaphragm, an annular ring carried by each of said inlet and outlet sections and in axial alignment with each other, and means between said inlet and outlet sections for clamping the outer margin of one of said diaphragms to one of said rings and the outer margins of the other of said diaphragms to the other of said rings.

7. A liquid level control valve comprising a casing having inlet and outlet sections and a passage therethrough, a pair of axially aligned seats surrounding said passage at spaced points, a fluid pressure operated valve associated with each of said seats for controlling the passage of fluid therethrough, means including separate float operated pilot valves for controlling the fluid pressure operated valves, said fluid pressure valves each including a diaphragm, a pair of annular rings located centrally of said passage and spaced from said seats, and means intermediate said inlet and outlet sections for clamping the outer margin of one of said diaphragms to one of said rings and the outer margin of the other of said diaphragms to the other of said rings.

8. A liquid level control valve comprising a casing having a passage therethrough, a pair of aligned valve seats surrounding said passage at spaced points, a fluid pressure operated valve associated with each of said valve seats for controlling the flow of fluid through said passage, means including separate float operated pilot valves for controlling said fluid pressure operated valves, and a central guide pin extending through both said fluid pressure operated valves.

9. A liquid level control valve comprising a casing having an inlet section, an outlet section, and an intermediate section, the inlet section having an inlet port surrounded by a valve seat, said intermediate section also having a port surrounded by a valve seat, an outlet port in the outlet section, a fluid pressure operated valve associated with each of said seats for controlling the passage of fluid through the respective ports, means including separate float operated pilot valves for controlling the fluid pressure operated valves, a passage leading from the discharge side of the fluid pressure operated valve in the inlet section to the port in the intermediate section, and another passage leading from the discharge side of the fluid pressure valve in the intermediate section to the outlet port in the outlet section, and means for securing said sections together.

10. A liquid level control valve comprising a casing having three axially aligned sections including an inlet section, an outlet section, and an intermediate section, said sections having aligned ports, fluid pressure operated valves associated with the ports in the inlet and intermediate sections for controlling the flow of fluid therethrough, means including separate float operated pilot valves for controlling the fluid pressure operated valves, a passage leading from the discharge side of the fluid pressure operated valve in the inlet section to the port in the intermediate section, and another passage leading from the discharge side of the fluid pressure valve in the intermediate section to the outlet port in the outlet section, and means located centrally of said sections for securing said sections together.

11. In a liquid level control valve, a casing having axially aligned inlet, outlet, and intermediate sections and a continuous passage through said sections, valve seats in the inlet and intermediate sections surrounding said passage at spaced points, a fluid pressure operated valve associated with each seat for controlling the passage of fluid therethrough, means including separate float operated pilot valves for controlling the fluid pressure valves, said fluid pressure valves each including a diaphragm, axially aligned annular rings in said inlet and intermediate sections spaced from the valve seats, a central wall portion on said intermediate section clamping one of said diaphragms to the ring in said inlet section and a central wall portion on said outlet section clamping the other of said diaphragms to the ring in said intermediate section.

12. A liquid level control valve comprising a casing having an inlet and an outlet port and a through passage connecting the ports, a valve seat adjacent the inlet port and another valve seat between the first mentioned valve seat and the outlet port, two solid wall portions extending across the central part of the casing, one between the two valve seats and the other between the second mentioned valve seat and the outlet port, a fluid pressure operated valve associated with each of said valve seats for controlling the flow of fluid therethrough, means including separate float operated pilot valves for controlling the fluid pressure valves, said fluid pressure valves each including a flexible diaphragm, each diaphragm being attached at its inner margin to the respective fluid pressure valve and attached at its outer margin to one of said solid wall portions.

13. A liquid level control valve comprising a casing having axially aligned inlet, outlet, and intermediate sections and a continuous passage through said sections, a valve seat surrounding the passage in the intermediate section, two solid wall portions extending across the central part of the casing, one between the two valve seats and the other beyond the valve seat in the intermediate section, a fluid pressure operated valve associated with each of said valve seats for controlling the flow of fluid therethrough, means including separate float operated pilot valves for controlling the fluid pressure valves, said fluid pressure valves each including a diaphragm, each diaphragm being attached at its inner margin to the respective fluid pressure valve and attached at its outer margin to one of said solid wall portions, and means passing through said wall portions for holding said sections together.

14. In a liquid level control valve, a casing having axially aligned inlet, outlet, and intermediate sections and a continuous passage through said sections, valve seats surrounding said passage at spaced points, a fluid pressure operated valve associated with each seat for controlling the passage of fluid therethrough, separate float operated pilot valves for controlling the fluid pressure valves, a centrally extending abutment wall in said outlet section, an oppositely facing shoulder on the inlet section, and a fastening device extending through the central portion of said sections and in engagement with the abutment wall and said shoulder for securing said sections together.

15. A liquid level control valve comprising a casing having axially aligned inlet, outlet, and intermediate sections and a continuous passage through said sections, a valve seat surrounding the passage in the inlet section and another valve seat surrounding the passage in the intermediate section, two solid wall portions extending across the central part of the casing, one between the two valve seats and the other beyond the valve seat in the intermediate section, a fluid pressure operated valve associated with each of said valve seats for controlling the flow of fluid therethrough, separate float operated pilot valves for controlling the fluid pressure valves, said fluid pressure valves each including a diaphragm, each diaphragm being attached at its inner margin to the respective fluid pressure valve and attached at its outer margin to one of said solid wall portions, a bolt passing through said solid wall portions and adapted to hold the inlet, outlet, and intermediate casing sections together, and sealing means disposed between said bolt and each of said walls portions.

MORGAN L. SWEENEY, Jr.

REFERENCES CITED

The following references are of record in the file of this patent:

UNITED STATES PATENTS

| Number | Name | Date |
| --- | --- | --- |
| 2,477,186 | Koehler | July 26, 1949 |

FOREIGN PATENTS

| Number | Country | Date |
| --- | --- | --- |
| 15,233 | Great Britain | Dec. 11, 1885 |